United States Patent
Merlin

(10) Patent No.: US 11,237,066 B2
(45) Date of Patent: Feb. 1, 2022

(54) TEMPERATURE-DETERMINING DEVICE AND METHOD FOR CALIBRATING SAME AND FOR DETERMINING A MEDIUM TEMPERATURE

(71) Applicant: ABB Schweiz AG, Baden (CH)

(72) Inventor: Tilo Merlin, Linsengericht (DE)

(73) Assignee: ABB SCHWEIZ AG, Baden (CH)

( * ) Notice: Subject to any disclaimer, the term of this patent is extended or adjusted under 35 U.S.C. 154(b) by 511 days.

(21) Appl. No.: 16/157,132

(22) Filed: Oct. 11, 2018

(65) Prior Publication Data
US 2019/0041275 A1 Feb. 7, 2019

Related U.S. Application Data

(63) Continuation of application No. PCT/EP2017/059232, filed on Apr. 19, 2017.

(30) Foreign Application Priority Data
Apr. 19, 2017 (DE) ............... 10 2016 107 335.0

(51) Int. Cl.
*G01K 15/00* (2006.01)
*G01J 5/00* (2006.01)
(Continued)

(52) U.S. Cl.
CPC ......... *G01K 15/005* (2013.01); *G01K 1/143* (2013.01); *G01K 1/20* (2013.01); *G01K 7/427* (2013.01); *G01K 13/02* (2013.01)

(58) Field of Classification Search
USPC .................... 374/1, 121, 208, 147
See application file for complete search history.

(56) References Cited

U.S. PATENT DOCUMENTS

| 5,522,662 A | 6/1996 | Masahiro |
| 2003/0032893 A1 | 2/2003 | Jochim et al. |

(Continued)

FOREIGN PATENT DOCUMENTS

| DE | 87677 A1 | 2/1972 |
| DE | 69425846 T2 | 4/2001 |

(Continued)

*Primary Examiner* — Mirellys Jagan
(74) *Attorney, Agent, or Firm* — Leydig, Voit & Mayer, Ltd

(57) ABSTRACT

A temperature-determining device for determining a temperature (TMED) of a medium via a temperature of a surface includes: an ambient-temperature sensor, arranged in surroundings of the surface, for measuring an ambient temperature (TU); a surface-temperature sensor, lying on the surface, for measuring a mixed temperature (TM) lying between the temperature (TMED) of a medium and the ambient temperature (TU); and an arithmetic-logic unit having an approximation formula electronically stored thereon for calculating an approximation (TMEDN) of a temperature of a medium. The approximation formula is a sum of the mixed temperature (TM) and a product of two factors. The first factor results from a difference between the mixed temperature (TM) and the ambient temperature (TU) and the second factor results from a ratio of a dividend to a quotient. The dividend results from a difference between a calibration temperature (TMEDKAL) of a medium and a calibration mixed temperature (TMKAL).

10 Claims, 2 Drawing Sheets

(51) Int. Cl.
*G01K 13/00* (2021.01)
*G01K 1/00* (2006.01)
*G01K 1/143* (2021.01)
*G01K 1/20* (2006.01)
*G01K 7/42* (2006.01)
*G01K 13/02* (2021.01)

(56) References Cited

U.S. PATENT DOCUMENTS

2007/0206655 A1 9/2007 Haslett et al.
2008/0300819 A1 12/2008 Jochim
2019/0049278 A1* 2/2019 Yamazaki ............. G01F 1/6847

FOREIGN PATENT DOCUMENTS

| DE | 10139705 A1 | 4/2003 |
| DE | 102007025806 B3 | 6/2008 |
| DE | 102015000728 A1 | 7/2016 |
| GB | 2500034 A | 9/2013 |
| JP | 07198503 A | 8/1995 |
| SU | 520518 A1 | 7/1976 |
| WO | 2009051588 A1 | 4/2009 |

* cited by examiner

TEMPERATURE-DETERMINING DEVICE AND METHOD FOR CALIBRATING SAME AND FOR DETERMINING A MEDIUM TEMPERATURE

CROSS-REFERENCE TO PRIOR APPLICATION

This application is a continuation of International Patent Application No. PCT/EP2017/059232, filed on Apr. 19, 2017, which claims priority to German Patent Application No. DE 10 2016 107 335.0, filed on Apr. 20, 2016. The entire disclosure of both applications is hereby incorporated by reference herein.

FIELD

The invention relates to a temperature-determining device for determining a temperature of a medium via the temperature of a surface surrounding the medium, said device comprising an ambient-temperature sensor, arranged in the surroundings of the surface, for measuring an ambient temperature, and a surface-temperature sensor, which lies on the surface, for measuring a mixed temperature lying between the temperature of a medium and the ambient temperature. The invention also relates to a method for calibrating the temperature-determining device and to a method for determining a temperature of a medium.

BACKGROUND

The application range of the invention extends to temperature-determining devices in which a surface-temperature sensor lies on a surface in order to determine the temperature of a medium lying therebeneath or therebehind. Ideally, a sensor of this type should record the temperature of the medium that is surrounded by the surface. If the temperature sensor is for example in the form of an electrical thermocouple, the temperature of the sensor, and thus the temperature of the medium, can be concluded by measuring the thermoelectric voltage, provided that both the sensor and the medium are in thermal equilibrium, that is to say that they have the same temperature.

This approach, which is known from the generally known prior art, is disadvantageous in that the surface-temperature sensor not only thermally interacts with the surface, but also with its surroundings, for example the ambient air. As a result, in practice the surface-temperature sensor measures neither the temperature of the medium nor of the surface; instead, it measures a mixed temperature that lies between the temperature of the medium and the ambient temperature.

DD 87 677 B1 discloses a temperature-determining device for determining the temperature of liquid and semi-liquid masses, which device comprises, in addition to a sensor in the tip of a rod-shaped temperature sensing element that is submerged in the medium, a second sensor in the shaft of the sensing element. The device comprises an arithmetic-logic unit having an approximation formula electronically stored thereon for calculating an approximation of a temperature of a medium, the approximation formula being stored as the sum of the mixed temperature and a product of two factors, one factor resulting from the difference between the mixed temperature and the ambient temperature and the second factor being a calibration factor.

SUMMARY

In an embodiment, the present invention provides a temperature-determining device for determining a temperature (TMED) of a medium via a temperature of a surface, the device comprising: an ambient-temperature sensor, which is arranged in surroundings of the surface, configured to measure an ambient temperature (TU); a surface-temperature sensor, which lies on the surface, configured to measure a mixed temperature (TM) lying between the temperature (TMED) of a medium and the ambient temperature (TU); and an arithmetic-logic unit having an approximation formula electronically stored thereon for calculating an approximation (TMEDN) of a temperature of a medium, the approximation formula being stored as a sum of the mixed temperature (TM) and a product of two factors, the first factor comprising a difference between the mixed temperature (TM) and the ambient temperature (TU) and the second factor comprising a ratio of a dividend to a quotient, the dividend comprising a difference between a calibration temperature (TMEDKAL) of a medium and a calibration mixed temperature (TMKAL), and the divisor comprising a difference between the calibration mixed temperature (TMKAL) and a calibration ambient temperature (TUKAL).

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
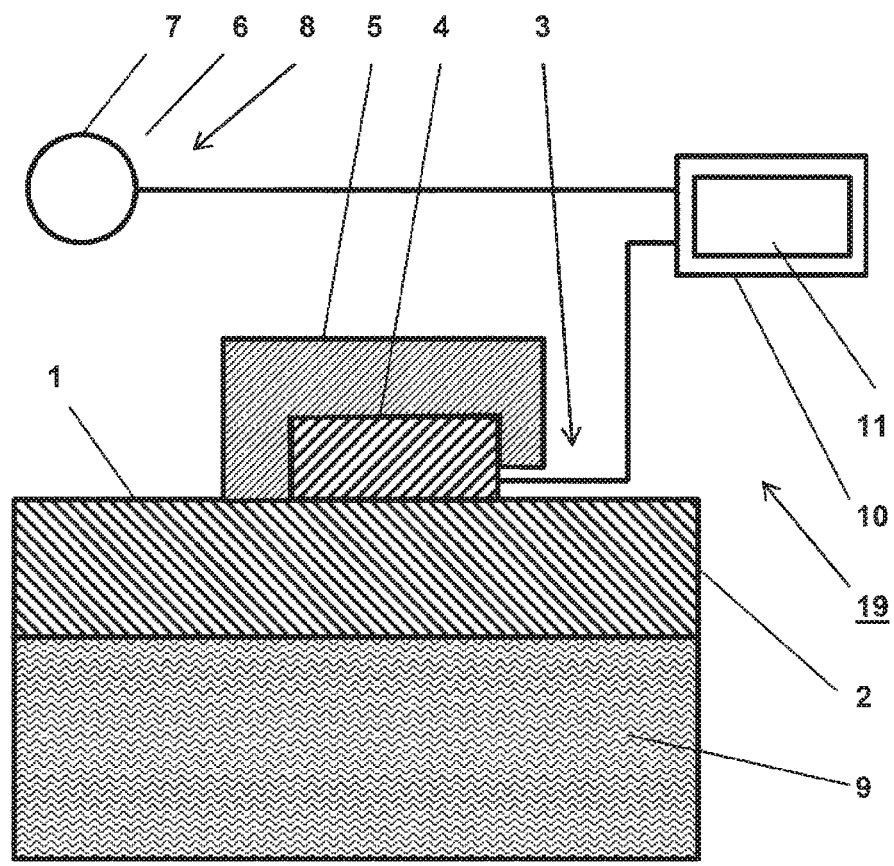
FIG. 1 is the diagram of a temperature-determining device according to the invention.

The object of the present invention is that of providing the method for non-invasive measurement of a temperature of a medium through a housing wall surrounding the medium, of providing a temperature-determining device and providing a method for calibrating and operating same, in which a systematic measurement error, introduced owing to the influence of the ambient temperature, is prevented as simply as possible.

The invention includes the technical teaching whereby, in addition to a surface-temperature sensor, a temperature-determining device also comprises an ambient-temperature sensor which measures the ambient temperature of the medium surrounding the surface, for example air, an arithmetic-logic unit being provided that has an approximation formula electronically stored thereon, this approximation formula being an approximation value that provides the temperature of a medium and is stored as the sum of the mixed temperature, measured by the surface-temperature sensor, and a product of two factors, the first factor resulting from the difference between the mixed temperature and the ambient temperature, and the second temperature resulting from a ratio of a dividend to a quotient, the dividend resulting as the difference between a previously stored calibration temperature of a medium and a likewise previously stored calibration mixed temperature, and the divisor resulting from the difference between the calibration mixed temperature and a previously stored calibration ambient temperature.

The central concept of this technical solution builds on the fact that the mixed temperature, measured and provided by the surface-temperature sensor, corresponds to the temperature of a medium that is distorted by the ambient temperature. In a first approximation, based for example on the first order of a Taylor development, the distortion and/or deviation of the actual temperature of a medium by the ambient temperature is linear. According to the invention, a constellation of temperatures, characterizing this linear relationship, is stored on the arithmetic-logic unit, said constellation consisting of the three thermally interlinked temperatures in the form of a calibration mixed temperature, a calibration ambient temperature and a calibration temperature of a medium. These temperatures may for example be recorded during a calibration process or be calculated by numeric simulations with the aid of known process parameters and/or known material properties. In this case, the influence of the ambient temperature on the mixed temperature of the surface-temperature sensor depends inter alia on the existence and shape, and for example the thermal capacity, of a housing of the surface sensor, and on the design of the surface enclosing the medium (material, wall thickness, etc.) and the medium itself.

The electronically stored approximation formula, provided according to the invention, is designed such that the following essential criteria are met:

In a first criterion, if the mixed temperature corresponds to the ambient temperature, the approximation value of a temperature of a medium to be calculated corresponds precisely to the measured ambient temperature. However, if, specifically, the temperature of a medium were to deviate from the ambient temperature, a value would form between these two temperatures as the mixed temperature, and not as a value that corresponds exactly to the ambient temperature.

In a second criterion, if the measured mixed temperature simultaneously corresponds precisely to the calibration mixed temperature and the measured ambient temperature simultaneously corresponds precisely to the calibration ambient temperature, the approximation of a temperature of a medium to be calculated also has to correspond precisely to the calibration temperature of a medium. This is achieved in accordance with the definition of the approximation formula such that, in this case, all the parts of the equation, up to the calibration temperature of a medium, cancel out or subtract out.

As the final criterion, the equation is linear; it thus describes a linear relationship between the deviation of the mixed temperature from the temperature of a medium and the difference between the mixed temperature and the ambient temperature. Advantageous in this instance is a particularly simple modeling of a thermally relatively complex system, which modeling in practice provides very precise predictions about the temperature of a medium on the basis of the measured mixed temperature and the ambient temperature. In this case, the proportionality factor, which characterizes the linear equation, is dependent on the thermal properties of the materials used and the manner in which they are brought together, and can for example be determined by calibration or—in the case of sufficiently known properties—by simulation.

As a result, this approximation formula is therefore intended to linearly interpolate between two known states or to linearly extrapolate outside thereof, the first state being that in which the mixed temperature lies between the ambient temperature and the calibration mixed temperature and the second state being that in which the mixed temperature is lower than the ambient temperature or is higher than the calibration mixed temperature.

In a preferred embodiment of the invention, the approximation formula is stored as $TMEDN=TM+(TM-TU)*((TOKAL-TMKAL)/(TMKAL-TUKAL))$, the approximation of a temperature of a medium being TMEDN, the mixed temperature being TM, the ambient temperature being TU, the calibration temperature of the medium being TMEDKAL, the calibration mixed temperature being TMKAL and the calibration ambient temperature being TUKAL. The three above-mentioned criteria are met in each case by this equation.

In accordance with a method according to the invention, the temperature of a medium is determined in that a mixed temperature between the temperature of a medium and an ambient temperature is measured, and the ambient temperature is additionally measured, and finally an approximation value for the temperature of a medium is calculated, the approximation formula for calculating this approximation value relating to a previously described linear relationship and being the basis for a calibration ambient temperature of the ambient-temperature sensor, a calibration temperature of a medium and a calibration mixed temperature of the surface sensor. Advantageously, the approximation formula is stored in this case as set out previously.

In order to calibrate a temperature-determining device, a method is proposed according to the invention, in which, in a calibration scenario in which the temperature of a medium differs from the ambient temperature, a calibration mixed temperature is recorded by the surface sensor. The absolute value of this calibration mixed temperature is then dependent on the existence, shape and for example the thermal capacity of the housing of the surface sensor and other thermally relevant aspects. In two further steps, a calibration mixed temperature and a calibration ambient temperature are recorded and, in addition, the calibration temperature of a medium is also measured exactly by a measuring instrument that provides values that are independent of the ambient temperature, i.e. said values are undistorted. By knowing the calibration mixed temperature, calibration ambient temperature and the calibration temperature of a medium, an approximation formula as set out above is stored.

In a preferred embodiment of the invention, the calibration temperature of a medium is measured in a contactless manner and in particular with the aid of an infrared thermometer which is thermally insulated from the surroundings of the surface enclosing the medium. As a result, it is in particular possible to detect the temperature of a medium without being influenced by the ambient temperature.

According to FIG. 1, a temperature-determining device 19 according to the invention comprises a surface-temperature sensor 4, which is attached to the surface 1 of a pipe 2, has a mixed temperature 3 and is surrounded by a housing 5. The housing 5 is, in turn, surrounded by the air of its surroundings 6. An ambient-temperature sensor 7 is arranged in the vicinity of the housing 5 and measures the ambient temperature 8 of the air located there. The temperature 9 of a medium and the temperature of the surface 1 is higher than the ambient temperature 8 of the ambient air. As a result, a mixed temperature 3 of the surface-temperature sensor 4 arranged in the housing 5 occurs, which temperature lies between the temperature 9 of a medium and the ambient temperature 8.

An arithmetic-logic unit 10 is connected to the surface-temperature sensor 4 and the ambient-temperature sensor 7 and calculates an approximation 11 of a temperature of a medium that is linearly dependent on the difference between the ambient temperature 8 and the measured mixed temperature 3. In this case, the proportionality factor is dependent on calibration values that have been previously defined for example by calibration 12 or by numerical simulation.

Figure 2:
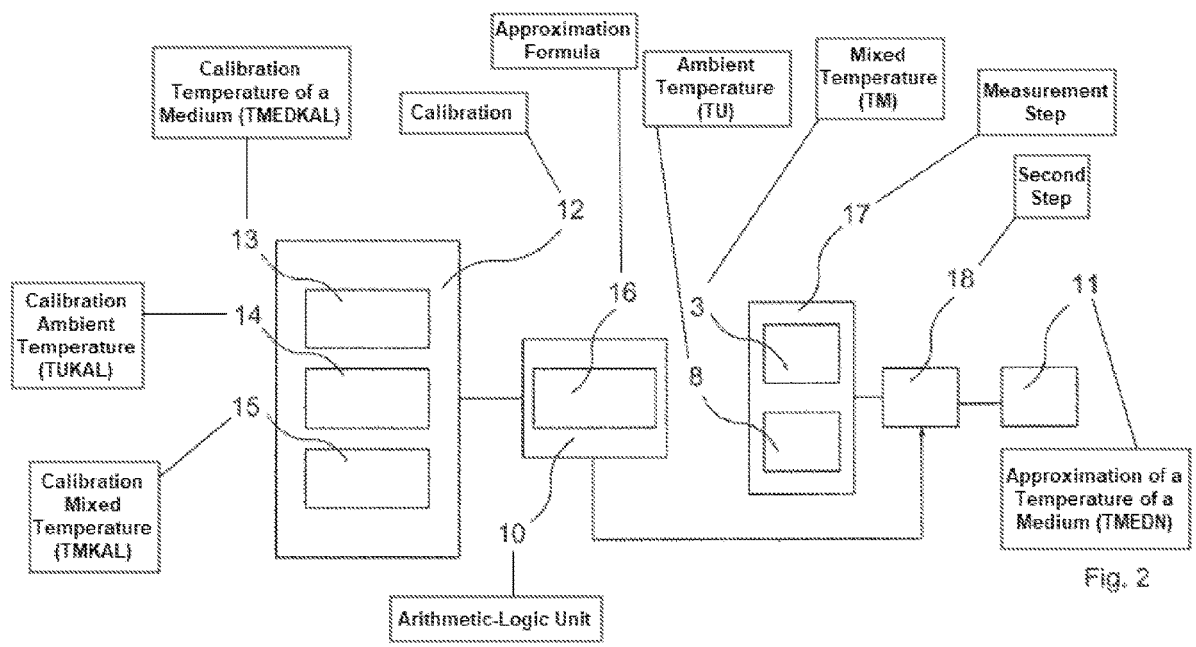
FIG. 2 is the diagram of a method according to the invention for calibrating and operating a temperature-determining device.

According to FIG. 2, the calibration 12 of a temperature-determining device is carried out once by a calibration temperature 13 of a medium being recorded by an infrared thermometer, a calibration ambient temperature 14 being recorded by an ambient-temperature sensor 7, and a calibration mixed temperature 15 being recorded by a medium-temperature sensor 4, and is electronically stored in an arithmetic-logic unit 10 and is used for defining an approximation formula 16.

Following this, in steps that can be repeated as often as required, in a measurement step 17 an ambient temperature 8 and a mixed temperature 3 are measured and in a second step 18 an approximation 11 of a temperature of a medium is calculated by an arithmetic-logic unit 10 using the approximation formula 16. Therefore, in contrast to the calibration 12, there is less need for a measurement, and thus a measurement instrument.

Figure 3:
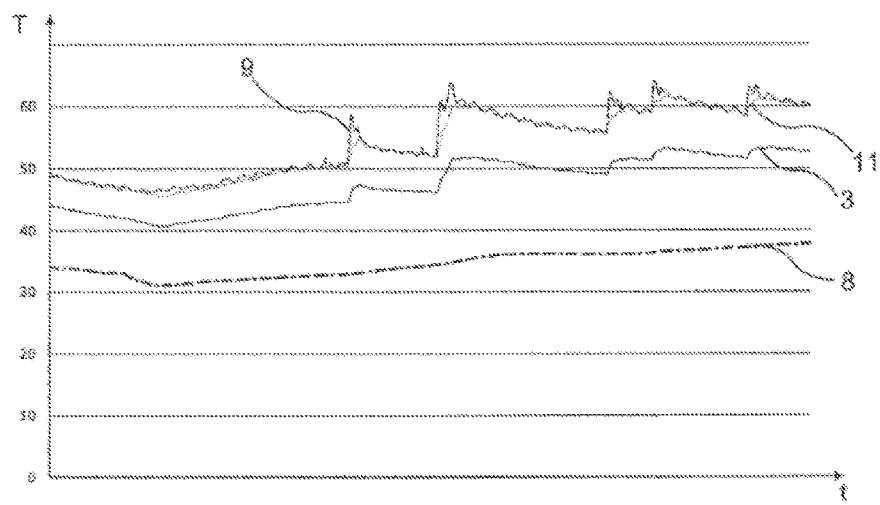
FIG. 3 is a graphical representation of measured temperatures and a calculated temperature.

FIG. 3 shows in a coordinate system, which plots temperature T in degrees Celsius over the time t, a graphical representation of a measured ambient temperature 8 (dashed-dotted line), a measured mixed temperature 3 (solid line), an approximation 11 of a temperature of a medium (dotted line), calculated using the method according to the invention, and the actually existing temperature 9 of a medium (dashed line). Firstly, the influence of the ambient temperature 8 on the mixed temperature 3 and the very precise compensation of this influence by means of the method described can be seen in particular. This influence can be seen in particular from the fact that the temperature 9 of a medium and the approximation 11 of a temperature of a medium lie one on top of the other so as to be almost superimposed. Deviations primarily relate to high frequency oscillations, which can be explained for example by the inertia of the surface-temperature sensor 4, of the ambient-temperature sensor 7 or by the thermal capacity of the surface sensor 4 or its housing 5.

The invention is not restricted to the previously described embodiments; instead, modifications thereto are also conceivable which are encompassed by the following claims. For example, it is also conceivable that more than one surface-temperature sensor or more than one ambient-temperature sensor are provided, or that the surface sensor is not surrounded by a housing.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 surface
2 pipe
3 mixed temperature (TM)
4 surface-temperature sensor
5 housing
6 surroundings
7 ambient-temperature sensor
8 ambient temperature (TU)
9 temperature of a medium (TMED)
10 arithmetic-logic unit
11 approximation of a temperature of a medium (TMEDN)
12 calibration
13 calibration temperature of a medium (TMEDKAL)
14 calibration ambient temperature (TUKAL)
15 calibration mixed temperature (TMKAL)
16 approximation formula
17 measurement step
18 second step
19 temperature-determining device

What is claimed is:

1. A temperature-determining device for determining a temperature (TMED) of a medium via a temperature of a surface surrounding the medium, the device comprising:
   an ambient-temperature sensor, which is arranged in surroundings of the surface, configured to measure an ambient temperature (TU);
   a surface-temperature sensor, which lies on the surface, configured to measure a mixed temperature (TM) lying between the temperature (TMED) of the medium and the ambient temperature (TU); and
   an arithmetic-logic unit having an approximation formula electronically stored thereon for calculating an approximation (TMEDN) of a temperature of the medium, the approximation formula being stored as a sum of the mixed temperature (TM) and a product of two factors, the first factor comprising a difference between the mixed temperature (TM) and the ambient temperature (TU) and the second factor comprising a ratio of a dividend to a divisor, the dividend comprising a difference between a calibration temperature (TMEDKAL) of the medium and a calibration mixed temperature (TMKAL), and the divisor comprising a difference between the calibration mixed temperature (TMKAL) and a calibration ambient temperature (TUKAL).

2. The temperature-determining device according to claim 1, wherein the approximation formula is stored as $TMEDN = TM + (TM - TU) * ((TMEDKAL - TMKAL) / (TMKAL - TUKAL))$.

3. A method for operating a temperature-determining device for determining a temperature (TMED) of a medium via a temperature of a surface surrounding the medium, the method comprising:
   measuring an ambient temperature (TU) in surroundings of the surface;
   measuring a mixed temperature (TM) lying between a temperature (TMED) of the medium and the ambient temperature (TU);
   according to which measurements, calculating an approximation (TMEDN) of a temperature of the medium using an arithmetic-logic unit, the approximation being a sum of the mixed temperature (TM) and a product of two factors, the first factor comprising a difference between the mixed temperature (TM) and the ambient temperature (TU) and the second factor comprising a ratio of a dividend to a divisor, the dividend comprising a difference between a calibration temperature (TMEDKAL) of the medium and a calibration mixed temperature (TMKAL), and the divisor comprising a difference between the calibration mixed temperature (TMKAL) and a calibration ambient temperature (TUKAL).

4. The method according to claim 3, wherein the approximation (TMEDN) of a temperature of the medium is calculated as TMEDN=TM+(TM −TU)*((TMEDKAL −TMKAL)/(TMKAL −TUKAL)).

5. A method for calibrating a temperature-determining device for determining a temperature (TMDE) of a medium via a surface surrounding the medium, the method comprising:
   measuring a calibration ambient temperature (TUKAL) in surroundings of a surface;
   measuring a calibration temperature (TMEDKAL) of the medium;
   measuring a calibration mixed temperature (TMKAL), of a surface-temperature sensor, lying between the calibration temperature (TMEDKAL) of the medium and the calibration ambient temperature (TUKAL); and
   storing an approximation formula, for calculating an approximation (TMEDN) of a temperature of the medium, as a sum of a mixed temperature (TM) and a product of two factors, the first factor comprising a difference between the mixed temperature (TM) and an ambient temperature (TU) and the second factor comprising a ratio of a dividend to a divisor, the dividend comprising a difference between a calibration temperature (TMEDKAL) of the medium and the calibration mixed temperature (TMKAL), and the divisor comprising a difference between the calibration mixed temperature (TMKAL) and the calibration ambient temperature (TUKAL).

6. The method according to claim 5, wherein the approximation formula is stored as TMEDN=TM+(TM −TU)* ((TMEDKAL −TMKAL)/(TMKAL −TUKAL)).

7. The method according to claim 5, wherein the calibration temperature (TMEDKAL) of the medium is calculated from at least one other known process variable.

8. The method according to claim 5, wherein the calibration temperature (TMEDKAL) of the medium is calculated from known material properties.

9. The method according to claim 5, wherein the calibration temperature (TMEDKAL) of the medium is measured in a contactless manner.

10. The method according to claim 9, wherein the calibration temperature (TMEDKAL) of the medium is measured by an infrared thermometer.

\* \* \* \* \*